(12) United States Patent
Kallman

(10) Patent No.: US 8,226,056 B2
(45) Date of Patent: Jul. 24, 2012

(54) PORTABLE VIDEO STAND

(76) Inventor: Tom Kallman, Lino Lakes, MN (US)

(*) Notice: Subject to any disclaimer, the term of this patent is extended or adjusted under 35 U.S.C. 154(b) by 559 days.

(21) Appl. No.: 12/360,302

(22) Filed: Jan. 27, 2009

(65) Prior Publication Data

US 2010/0140425 A1 Jun. 10, 2010

Related U.S. Application Data

(60) Provisional application No. 61/032,455, filed on Feb. 29, 2008.

(51) Int. Cl.
*E04G 25/00* (2006.01)
(52) U.S. Cl. .................. 248/200.1; 248/441.1; 248/454
(58) Field of Classification Search .................. 248/161, 248/200.1, 451, 441.1, 354.1, 410, 694, 644; 224/483, 42.32, 539, 551, 554, 566, 568, 224/561, 565; 211/123; 108/45, 48, 152; D7/620; 396/428
See application file for complete search history.

(56) References Cited

U.S. PATENT DOCUMENTS

| | | | | | |
|---|---|---|---|---|---|
| 1,849,990 | A | * | 3/1932 | Otsuki | 248/454 |
| 2,219,169 | A | * | 10/1940 | Alter | 248/694 |
| 2,901,860 | A | * | 9/1959 | Crawford | 211/85.6 |
| 3,022,974 | A | * | 2/1962 | Knodel | 248/200.1 |
| 3,231,230 | A | * | 1/1966 | Mueller | 248/449 |
| 4,969,623 | A | * | 11/1990 | Bernier | 248/441.1 |
| 5,275,364 | A | * | 1/1994 | Burger et al. | 248/125.1 |

* cited by examiner

*Primary Examiner* — Gwendolyn Baxter
(74) *Attorney, Agent, or Firm* — James A. Italia; Italia IP

(57) ABSTRACT

A support for supporting an object such as audiovisual equipment within a motor vehicle in operable position for viewing by passengers of the motor vehicle. The support may comprise an expansible post comprising spring urged telescoping sections and an adjustable shelf. The shelf may comprise a collar having a setscrew enabling selective positioning of the shelf along the post both along the length and also at a selected angular orientation. A variable length arm may fix the shelf at a selected orientation within a range from vertical to horizontal when the post is vertically mounted within the motor vehicle. The post may have a soft pad for protecting the ceiling surface of the motor vehicle. The spring may be exposed at the bottom end of the post.

7 Claims, 2 Drawing Sheets

PORTABLE VIDEO STAND

CROSS-REFERENCE TO RELATED APPLICATION

The present application is a claims priority from provisional application 61/032,455 filed Feb. 29, 2008.

FIELD OF THE INVENTION

The present invention relates to supports, and more particularly to a spring biased vertical stand for video equipment.

BACKGROUND OF THE INVENTION

Passenger motor vehicles have been provided with built-in audiovisual equipment, including for example swing-down screens for displaying video. However, many vehicles do not have built-in audiovisual equipment. Audiovisual equipment has become widespread in ownership due to minimal dimensions and modest cost. Therefore, there are many vehicle owners who possess portable audiovisual equipment and vehicles not originally equipped with audiovisual equipment.

It would be desirable to adapt portable audiovisual equipment for use in motor vehicles.

SUMMARY OF THE INVENTION

The present invention provides a support for supporting audiovisual equipment not originally designed for incorporation into a motor vehicle to be supported in deployable positions within motor vehicles. The support mounts between the floor and the ceiling of the vehicle, or alternatively between the ceiling and other parts of the vehicle having horizontal support surfaces, such as seats and armrests.

The support may comprise a telescopic pole which is spring biased to expand between for example the ceiling and the floor. A support shelf is adjustably secured to the telescopic pole. The support shelf is adjustable as to its location along the height of the pole, its angular orientation at any selected height, and the angle of the shelf relative to a vertical orientation.

The support is self-contained and needs no engagement with the motor vehicle which would entail forming holes or making other penetrations into the motor vehicle. The novel support is therefore not only portable, but readily installed within and removed from a motor vehicle without tools and without damaging or altering the motor vehicle.

Audiovisual equipment such as portable digital video disc players may then be secured to the support shelf and used in the motor vehicle for the benefit of passengers in the motor vehicle.

It is therefore an object of the invention to enable portable audiovisual equipment to be used in a passenger motor vehicle.

It is an object to provide a self-contained support for audiovisual equipment which does not require penetration of the motor vehicle.

It is an object of the invention to provide improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION

Figure 1:
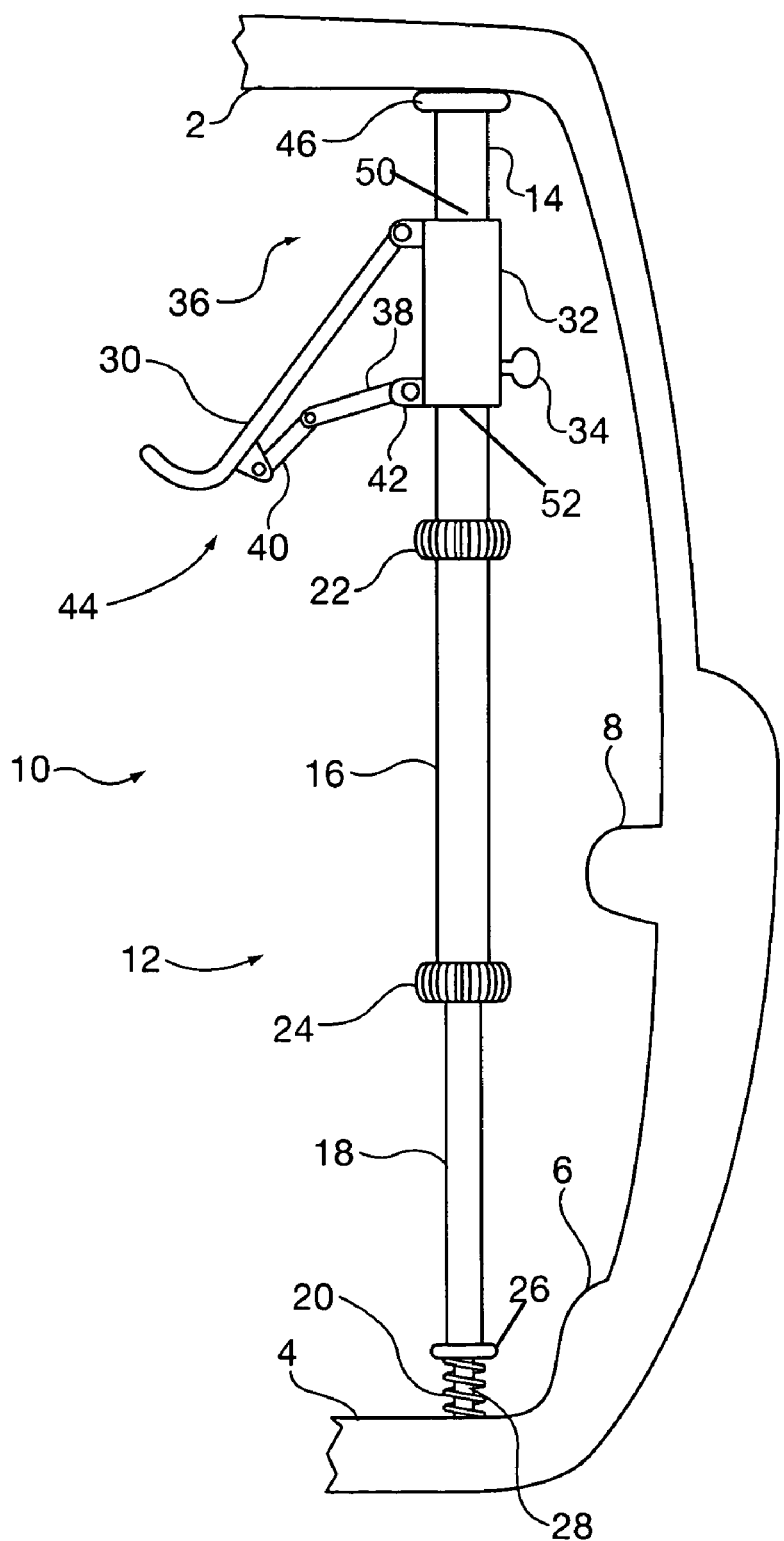
FIG. 1 is a side environmental view of a support according to at least one aspect of the invention mounted in the interior of a motor vehicle.

FIG. 1 shows a support 10 holding an object at a selected orientation within a motor vehicle (not shown in its entirety). The support 10 may comprise a post 12 which in FIG. 1 is lodged in vertical orientation within the passenger cabin of the motor vehicle, and more particularly between the ceiling 2 and the floor 4 of the passenger cabin. As employed herein, orientational terms such as vertical, upper, lower, and others will be understood to refer to the orientations depicted in the referenced drawing figures. In turn, the drawing figures depict their subject matter in orientations of normal use, such as in the illustrated motor vehicle. Therefore, orientational terms must be understood to provide semantic basis for purposes of description, and do not limit the invention or its component parts in any particular way.

Not being limited to engaging the floor 4, the support 10 may be anchored at its lower end against a threshold 6, the upper surface 8 of an armrest, or against any other suitably sturdy generally upwardly facing surface of the motor vehicle.

The post 12 is adjustable in length, and may comprise telescoping sections 14, 16, 18 disposed in coaxial relation to one another. Telescoping action enables adjustment of overall length of the post 12. A resilient expansion feature enables the post 12 to remain lodged in vertical orientation between two selected opposed horizontal surfaces of the motor vehicle. The length may be adjusted to about equal the dimension of open space between the two opposed surfaces, such as the ceiling 2 and the floor 4, which have been selected to support the support 10. Once a suitable overall length has been selected, the telescoping sections 14, 16, 18 may be locked or immobilized in their respective positions relative to one another. The resilient expansion feature is disposed to urge the upper and lower ends of the post 12 apart, thereby engaging the environmental surfaces securely by friction.

The post 12 may comprise locks 22, 24, which may be of the type used with conventional appliances (none shown) having telescoping legs. Each one of the locks 22, 24 may comprise a collar which may be screwed against its associated telescoping section 14 or 16. Each lock 22 or 24 may for example comprise a resilient member (not seen) which is compressed against the collar and the associated telescoping member, such as the telescoping members 14, 16 when the collar is screwed against the telescoping member 14 or 16. Such compression may thereby increase frictional engagement of an adjacent telescoping member such as the telescoping members 16, 18 to the point that spontaneous mutual relative motion in the axial direction between the telescoping members is opposed.

The resilient expansion feature may comprise one or more springs, such as a spring 20 located at the lower end of the post 12. The upper end of the spring 20 may seat against a flange 26 such that the spring 20 is constrained against traveling along its associated telescoping member, such as the telescoping member 18. The lower end is exposed to bear against the floor 4 or other selected horizontal surface of the motor vehicle. The spring 20 is biased to expand, such that expansion characteristics of the spring 20 lodge the post 12 against the floor 4 or other environmental surface.

Figure 3:
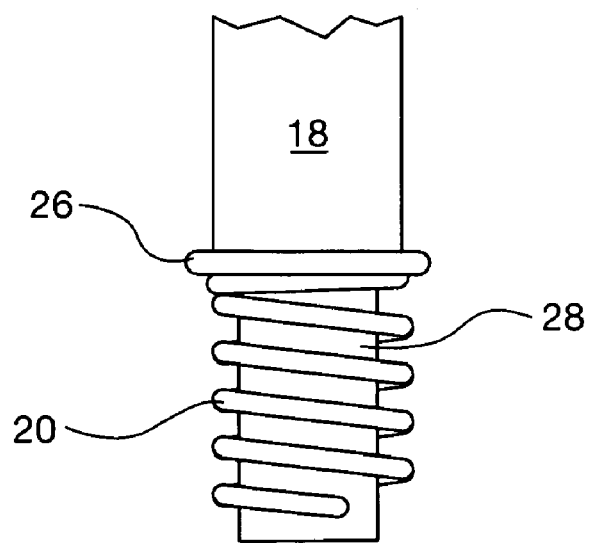
FIG. 3 is a side detail view of the lower end of a support according to one aspect of the invention, drawn to greater scale than that of FIG. 1.

An internal tube or rod 28 may be provided to guide the spring 20 to assure that the spring 20 remain substantially coaxial with its associated telescoping member, such as the telescoping member 18. The tube or rod 28 may be fixed to the telescoping member 18 or may be slidably retained thereto. These components may also be seen in the detail view of FIG. 3.

The support 10 may comprise a platform for receiving the object to be held on the support 10, such as a shelf 30. The shelf 30 is attached to the post 12 in the following way. A clamp is disposed to secure the shelf 30 to the post 12 at a selected location along the length of the post 12. The clamp also is disposed to secure the shelf 30 to the post 12 at a selected angular orientation with respect to the post 12. Alternatively stated, the shelf 30 may rotate about the post 12 throughout a full three hundred sixty degrees thereabout, and be locked at any selected position.

The clamp may comprise a sleeve or collar 32 which encircles the post 12, and which is movable axially and angularly along the circumferential surface of the post 12. The circumferential surface will be understood to comprise the outer cylindrical section of that telescoping section, such as the telescoping sections 14, 16, 18, to which the collar 32 is being fixed. A fastener such as a setscrew 34 having an enlarged head for tightening and untightening by hand threads to the collar 32. The setscrew 34 when tightened pins the collar 32 to its associated telescoping member by bearing against the latter. Because the collar 32 can be moved axially along its associated telescoping member and also rotated thereabout, the collar 32 and setscrew 34 collectively fix the collar 32 to the post 12 at any selected axial position along the post 12 and at any selected angular orientation relative to the post 12.

The support 10 may comprise an angle adjuster which is disposed to vary the angle of the shelf 30 at any selected orientation between vertical and horizontal when the post 12 is vertically oriented as depicted. The angle adjuster may comprise a hinge 36 disposed to pivotally hold the shelf 30 to the post 12, and a variable length arm disposed to secure the shelf 30 at a selected angle relative to the post 12. The variable length arm may for example comprise an articulated arm having an upper section 38 which is pivotally connected to a lower section 40. The upper section 38 may be pivotally connected to the collar 32 at a first hinge 42. The lower section 40 may be pivotally connected to the shelf 30 at a second hinge 44.

The hinge 36 is located proximate one end 50 of the collar 32 proximate the post 12, while the hinge 42 is located a second end 52 of the collar 32 proximate the post 12. The two ends 50, 52 of the collar 32 are located oppositely along the length of the collar 32.

The upper end of the post 12 is prevented from damaging a delicate environmental surface such as a headliner of the ceiling 2 by cushioning the point of contact by a soft pad 46 attached to the upper end of the post 12, such as the upper end of the telescoping member 14.

Figure 2:
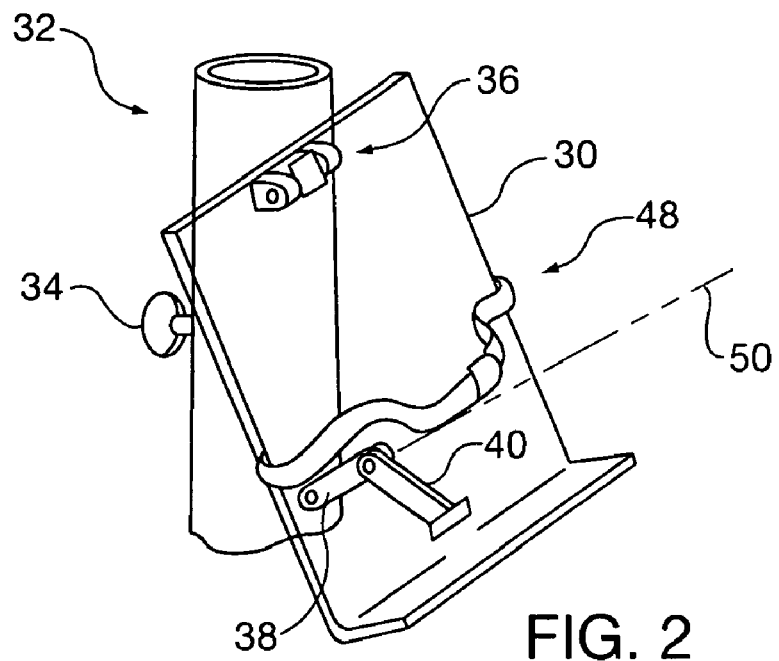
FIG. 2 is a perspective detail view of the shelf of the support of FIG. 1, drawn to greater scale than that of FIG. 1.

FIG. 2 shows the shelf 30 and the collar 32. The object intended to be held by the support 10 may be retained on the shelf 30 by a retainer which may comprise an elastic strap 48 which spans the shelf 30 and is disposed to hold the object thereagainst. The selected orientation of the shelf 30 may be assured by selecting friction characteristics of the pivot joint connecting the upper section 38 to the lower section 40 at the axis of mutual pivot 50. Alternatively, a securing arrangement (not shown) comprising a manual fastener may be employed.

The present invention is susceptible to modifications and variations which may be introduced thereto without departing from the inventive concepts. For example, referring now to FIG. 3, although the invention has been described with respect to the spring 20 being located at the lower end of the post 12, the spring 20 or a corresponding spring (not shown) may be relocated to the upper end of the post 12 or even to an intermediate location.

Also, the retainer which has been presented as the elastic strap 48 may comprise other holding devices including those comprising rigid arms, adhesive surfaces, hook and loop fasteners, threaded fasteners, spring clamps, magnets, and others.

A pad corresponding to the soft pad 46 may be provided to cushion the lower end of the post 12, either in addition to or instead of the pad 46.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

I claim:

1. A support for holding an object at a selected orientation within a motor vehicle, comprising:
   a post which is adjustable in length, which comprises a circumferential surface and a resilient expansion feature enabling the post to remain lodged between two opposed surfaces of the motor vehicle; and
   a shelf which is attached to the post and which comprises a platform for receiving the object, a retainer disposed to retain the object to the platform, and an angle adjuster which is disposed to vary an angle of the shelf at any selected orientation between vertical and horizontal when the post is vertically oriented, wherein the angle adjuster comprises a collar which encircles the post and is movable axially and angularly along the circumferential surface of the post and a fastener which engages the collar and is disposed to selectively fix the collar to the post at any selected axial position along the post and at any selected angular orientation relative to the post, the collar comprising a first end and an opposed second end located oppositely along the length of the collar, and the angle adjuster comprising an articulated arm comprising an upper section and a pivotally connected lower section, a first hinge disposed to connect the upper section pivotally to the collar at the first end of the collar proximate the post, and a second hinge disposed to connect the lower section pivotally to the shelf at the second end of the collar proximate the post.

2. The support of claim 1, wherein the post comprises telescoping sections disposed in coaxial relation.

3. The support of claim 2, wherein the resilient expansion feature comprises at least one spring having a first end and a second end, wherein the first end of the spring seats against one of the telescoping sections at the first end of the spring and wherein the second end of the spring is exposed to bear against a surface of the motor vehicle, such that expansion characteristics of the spring lodge the post against the environmental surface.

4. The support of claim 2, wherein at least one of the telescoping sections comprises a lock disposed to selectively lock the telescoping section to an adjacent telescoping section so as to prevent mutual axial movement between that telescoping section having the lock and the adjacent telescoping section, thereby securing the post at a selected overall length.

5. The support of claim 1, wherein the fastener comprises a setscrew disposed to bear against the post when the setscrew is tightened.

6. The support of claim 1, wherein the retainer comprises an elastic strap which spans the platform and is disposed to hold the object against the platform.

7. The support of claim 1, further comprising a soft pad disposed at one end of the post, for cushioning the point of contact between the post and that surface of the motor vehicle which is contacted by the post.

* * * * *